United States Patent
Jang

(10) Patent No.: US 12,267,450 B2
(45) Date of Patent: Apr. 1, 2025

(54) DISPLAY DEVICE

(71) Applicant: Samsung Display Co., Ltd., Yongin-si (KR)

(72) Inventor: Minsok Jang, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 364 days.

(21) Appl. No.: 17/723,760

(22) Filed: Apr. 19, 2022

(65) Prior Publication Data

US 2023/0049336 A1  Feb. 16, 2023

(30) Foreign Application Priority Data

Aug. 10, 2021 (KR) .................. 10-2021-0105602

(51) Int. Cl.
*H04M 1/02* (2006.01)
*G06F 1/16* (2006.01)

(52) U.S. Cl.
CPC ........ *H04M 1/0268* (2013.01); *G06F 1/1626* (2013.01); *G06F 1/1641* (2013.01)

(58) Field of Classification Search
CPC . H04M 1/0268; H04M 1/0214; G06F 1/1626; G06F 1/1641; G06F 1/1652; Y02E 10/549; G09F 9/301
See application file for complete search history.

(56) References Cited

U.S. PATENT DOCUMENTS

| | | |
|---|---|---|
| 10,074,824 B2 | 9/2018 | Han et al. |
| 2019/0213924 A1 | 7/2019 | Ha et al. |
| 2022/0155822 A1* | 5/2022 | Zhou ................... G06F 1/1652 |
| 2022/0312601 A1* | 9/2022 | Zhu ..................... G06F 1/1637 |
| 2022/0394860 A1* | 12/2022 | Park .................... B32B 3/266 |

(Continued)

FOREIGN PATENT DOCUMENTS

| | | |
|---|---|---|
| KR | 10-2011-0058103 A | 6/2011 |
| KR | 10-1726306 B1 | 4/2017 |
| KR | 10-2018-0036904 A | 4/2018 |

(Continued)

OTHER PUBLICATIONS

English translation for KR 20210036446 A. (Year: 2021).*

*Primary Examiner* — Marisol Figueroa
(74) *Attorney, Agent, or Firm* — Womble Bond Dickinson (US) LLP

(57) ABSTRACT

A display device includes: a first non-folding area; a second non-folding area; and a folding area to be folded relative to a folding axis, and between the first non-folding area and the second non-folding area; a display module; and a support module underneath the display module. The support module includes: a base layer including a base fiber, the base fiber including a glass fiber, a carbon fiber, or an aramid fiber; and a support layer including: a first sub-support portion corresponding to the first non-folding area, the first sub-support portion being located above and underneath the base layer; and a second sub-support portion corresponding to the second non-folding area, the second sub-support portion being located above and underneath the base layer. The first sub-support portion and the second sub-support portion includes a support portion resin including at least one of an acrylic resin, an epoxy resin, or a urethane resin.

20 Claims, 11 Drawing Sheets

(56) References Cited

U.S. PATENT DOCUMENTS

2023/0010332 A1* 1/2023 Gong ................. B32B 7/022
2024/0062685 A1* 2/2024 Cho .................. G06F 1/1656

FOREIGN PATENT DOCUMENTS

| KR | 10-2019-0085208 A | | 7/2019 | | |
|----|-------------------|---|--------|---|---|
| KR | 10-2097765 B1 | | 4/2020 | | |
| KR | 20210036446 A | * | 4/2021 | ............ | G09F 9/301 |

* cited by examiner

DISPLAY DEVICE

CROSS-REFERENCE TO RELATED APPLICATION

This application claims priority to and the benefit of Korean Patent Application No. 10-2021-0105602, filed on Aug. 10, 2021, the entire content of which is hereby incorporated by reference herein.

BACKGROUND

1. Field

Aspects of embodiments of the present disclosure relate to a display device. More particularly, aspects of embodiments of the present disclosure relate to a display device including a support module.

2. Description of the Related Art

Various kinds of display devices that are applied to multimedia devices, such as television sets, mobile phones, tablet computers, navigation units, game units, or the like, are being developed. In recent years, studies on a display device, which includes a flexible display member and is foldable and/or rollable, are being conducted to improve a user's convenience.

A support module is disposed under a display module to protect the display module included in the display device. The support module may have high strength to protect the display module, and flexibility to implement a flexible display device. Demands for development of a material and a structure for the support module that satisfy high strength characteristics and flexibility are increasing.

The above information disclosed in this Background section is for enhancement of understanding of the background of the present disclosure, and therefore, it may contain information that does not constitute prior art.

SUMMARY

One or more embodiments of the present disclosure are directed to a display device having excellent impact resistance and flexibility.

According to one or more embodiments of the present disclosure, a display device includes: a first non-folding area; a second non-folding area spaced from the first non-folding area; a folding area configured to be folded relative to a folding axis extending in a first direction, the folding area being located between the first non-folding area and the second non-folding area in a second direction crossing the first direction; a display module; and a support module underneath the display module, the support module including: a base layer including a base fiber, the base fiber including a glass fiber, a carbon fiber, or an aramid fiber; and a support layer including: a first sub-support portion corresponding to the first non-folding area, the first sub-support portion being located above and underneath the base layer; and a second sub-support portion corresponding to the second non-folding area, the second sub-support portion being located above and underneath the base layer. The first sub-support portion and the second sub-support portion include a support portion resin including at least one of an acrylic resin, an epoxy resin, or a urethane resin.

In an embodiment, the support module may further include a filling portion at the folding area between the first sub-support portion and the second sub-support portion, the filling portion including at least one of silicone, acrylate, or urethane.

In an embodiment, the base fiber may include: a plurality of vertical fibers extending in the first direction; and a plurality of horizontal fibers extending in the second direction. A fiber opening may be defined between the vertical fibers that are adjacent to each other and the horizontal fibers that are adjacent to each other.

In an embodiment, the support module may further include an adhesive layer on and underneath the support layer, and including at least one of silicone, acrylate, or urethane.

In an embodiment, the support module may further include a filling portion at the folding area between the first sub-support portion and the second sub-support portion, and the filling portion may include the same material as that of the adhesive layer, and may be formed integrally with the adhesive layer.

In an embodiment, the support module may further include a folding support portion between the first sub-support portion and the second sub-support portion to overlap with the folding area, the folding support portion including the support portion resin, and the folding support portion may have a thickness smaller than a thickness of each of the first sub-support portion and the second sub-support portion.

In an embodiment, a ratio of the thickness of the first sub-support portion, the thickness of the folding support portion, and the thickness of the second sub-support portion may be from 5:4:5 to 8:4:8.

In an embodiment, the support module may further include a filling portion on the folding support portion between the first sub-support portion and the second sub-support portion, the filling portion including at least one of silicone, acrylate, or urethane.

In an embodiment, the support module may further include an adhesive layer on and underneath the support layer, the adhesive layer including the same material as that of the filling portion, and formed integrally with the filling portion.

In an embodiment, the support module may further include a plurality of sub-folding support portions spaced from each other and overlapping with the folding area.

In an embodiment, the sub-folding support portions may include the same material as a material of the first and second sub-support portions.

In an embodiment, the support module may further include at least one filling portion between the sub-folding support portions, the at least one filling portion including at least one of silicone, acrylate, or urethane.

In an embodiment, the support module may further include an adhesive layer on and underneath the support layer, the adhesive layer including at least one of silicone, acrylate, or urethane.

In an embodiment, the support module may further include at least one filling portion between the sub-folding support portions, the at least one filling portion including the same material as that of the adhesive layer, and formed integrally with the adhesive layer.

According to one or more embodiments of the present disclosure, a display device includes: a first non-folding area; a second non-folding area spaced from the first non-folding area; a folding area configured to be folded relative to a folding axis extending in a first direction, and located between the first non-folding area and the second non-folding area in a second direction crossing the first direction; a display module; and a support module underneath the display module, the support module including: a base layer; and a support layer above and underneath the base layer, and defined at least one opening in an area corresponding to the folding area. The base layer includes a base fiber including a glass fiber, a carbon fiber, or an aramid fiber, and the support layer includes a support portion resin including at least one of an acrylic resin, an epoxy resin, or a urethane resin.

In an embodiment, the support module may further include at least one filling portion in the at least one opening, the at least one filling portion having a modulus smaller than a modulus of the support portion resin.

In an embodiment, a modulus of the support portion resin may be greater than or equal to about $10^3$ Mpa and less than or equal to about $10^4$ Mpa at a temperature of about −20° C.

In an embodiment, the display device may further include a folding support portion. The support layer may have one opening defined therethrough to entirely overlap with the folding area, and the folding support portion may be in the one opening and may include the support portion resin.

According to one or more embodiments of the present disclosure, a display device includes: a display module including a folding display portion, and a non-folding display portion adjacent to the folding display portion; and a support module underneath the display module, the support module including: a base layer including a base fiber, the base fiber including a glass fiber, a carbon fiber, or an aramid fiber; and a support layer above and underneath the base layer, the support layer defined at least one opening defined therethrough to overlap with the folding display portion, and a modulus greater than or equal to about $10^3$ Mpa and less than or equal to about $10^4$ Mpa at a temperature of about −20° C.

In an embodiment, the support module may further include at least one filling portion in the at least one opening, the filling portion having a modulus smaller than the modulus of the support layer.

According to one or more embodiments of the present disclosure, the support module of the display device may include a base layer including the base fiber, and the support layer including the sub-support portions disposed to be spaced apart from each other on the base layer. Accordingly, the display device may have excellent impact resistance and flexibility.

BRIEF DESCRIPTION OF THE DRAWINGS

The above and other aspects and features of the present disclosure will be more clearly understood from the following detailed description of the illustrative, non-limiting embodiments with reference to the accompanying drawings, wherein.

DETAILED DESCRIPTION

Figure 1A:
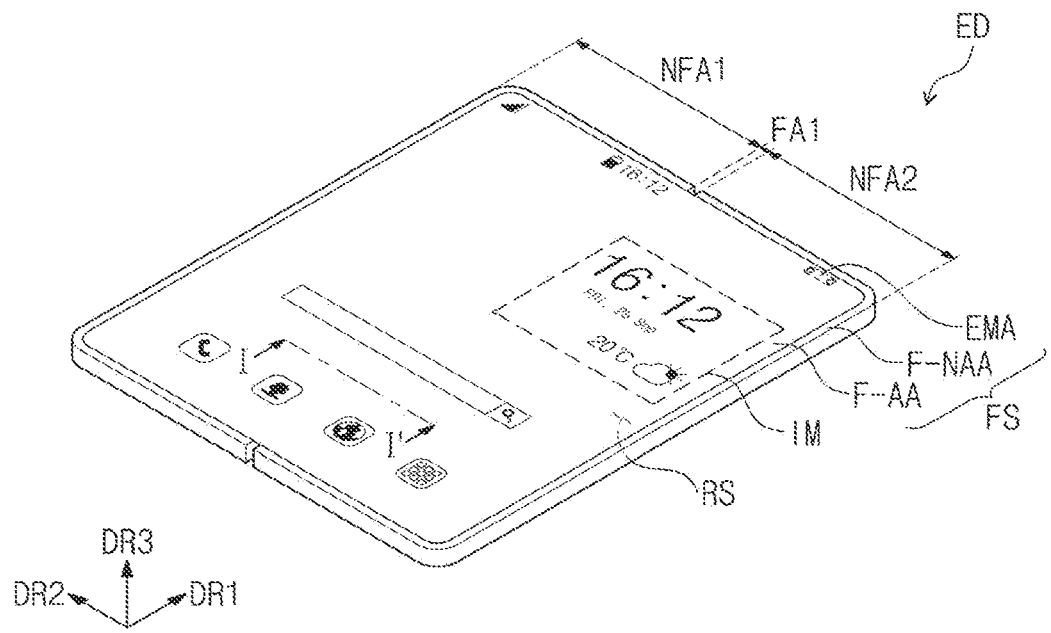
FIG. 1A is a perspective view showing a display device in an unfolded state according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
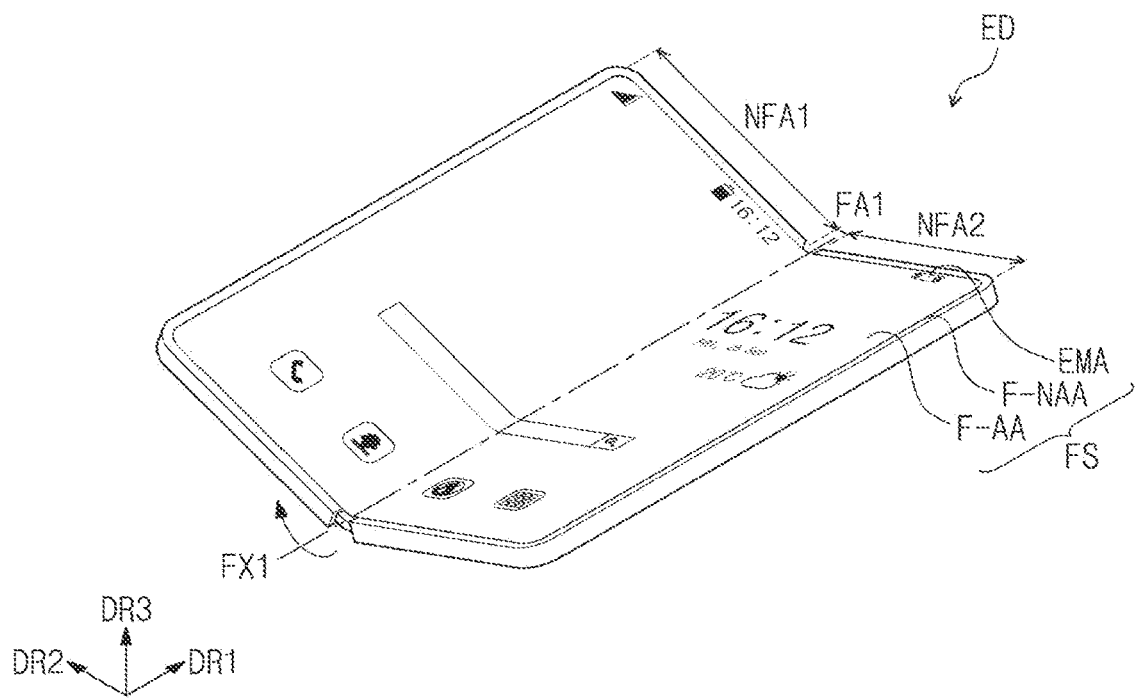
FIG. 1B is a perspective view showing the display device of FIG. 1A being inwardly folded according to an embodiment of the present disclosure.
Figure 1C:
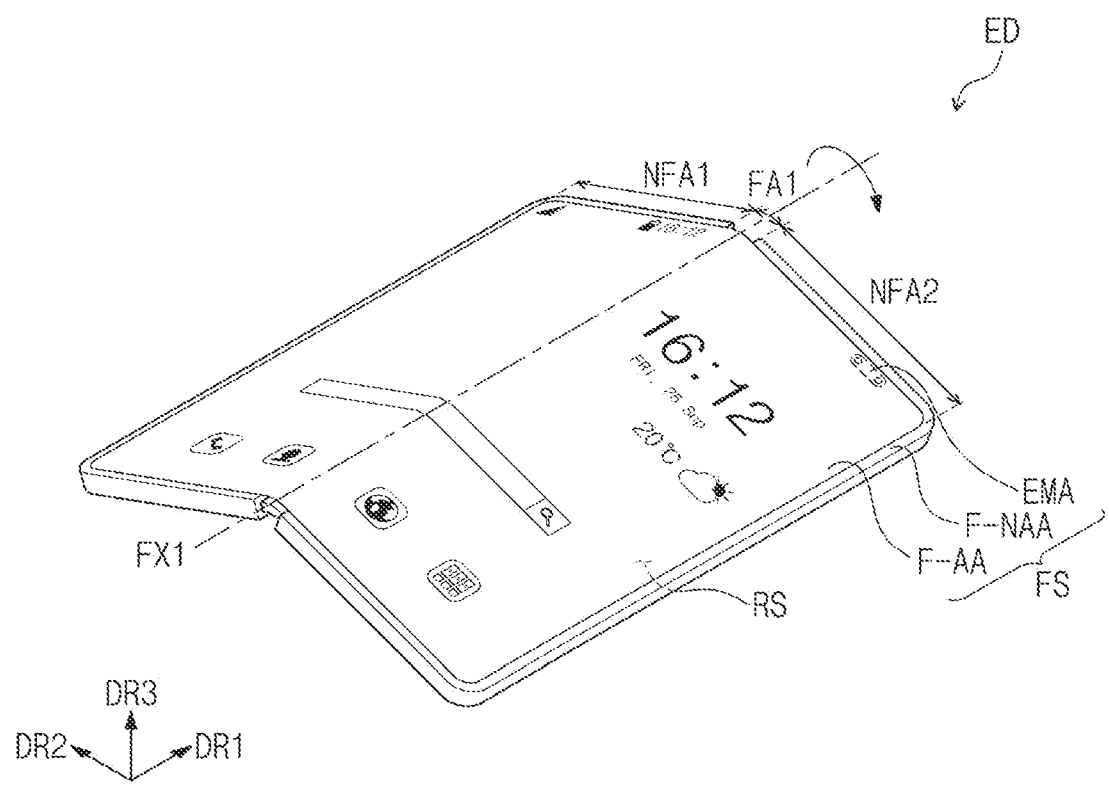
FIG. 1C is a perspective view showing the display device of FIG. 1A being outwardly folded according to an embodiment of the present disclosure.

FIG. 1A is a perspective view showing a display device ED in an unfolded state according to an embodiment of the present disclosure. FIG. 1B is a perspective view showing the display device ED of FIG. 1A being inwardly folded according to an embodiment of the present disclosure. FIG. 1C is a perspective view showing the display device ED of FIG. 1A being outwardly folded according to an embodiment of the present disclosure.

Referring to FIGS. 1A to 1C, the display device ED may be a device that is activated in response to electrical signals. As an example, the display device ED may be a mobile phone, a tablet computer, a car navigation unit (e.g., a car navigator or a car navigation device), a game unit (e.g., a game console or a gaming device), or a wearable device, but the present disclosure is not limited thereto or thereby. For convenience of illustration, FIG. 1A shows the mobile phone as a representative example of the display device ED.

The display device ED may include a first display surface FS defined by a first directional axis DR1 and a second directional axis DR2 crossing the first directional axis DR1. The display device ED may provide an image IM to a user through the first display surface FS. The display device ED may display the image IM through the first display surface FS, which is parallel to or substantially parallel to each of the first directional axis DR1 and the second directional axis DR2, in (e.g., toward) a third directional axis DR3. As used in the present disclosure, a front (or an upper) surface and a rear (or a lower) surface of each member of the display device ED may be defined with respect to a direction in which the image IM is displayed. For example, the front and rear surfaces may be opposite to each other in the third directional axis DR3, and a normal line direction of each of the front and rear surfaces may be parallel to or substantially parallel to the third directional axis DR3.

According to an embodiment, the display device ED may include the first display surface FS and a second display surface RS. The first display surface FS may include a first active area F-AA and a first peripheral area F-NAA. The first active area F-AA may include an electronic module area EMA. The second display surface RS may be opposite to at least a portion of the first display surface FS. In other words, the second display surface RS may be defined as a portion of a rear surface of the display device ED.

The display device ED may sense an external input applied thereto from the outside the display device ED. The external input may include various suitable forms of inputs that are provided from the outside the display device ED. For example, the external inputs may include a proximity input (e.g., such as hovering) applied when an object (e.g., such as a pen or a user's finger) approaches close to or adjacent to the display device ED at a suitable distance (e.g., a predetermined distance), as well as a touch input by the object (e.g., the pen or a portion of the user's body, such as the user's finger or hand). In addition, the external inputs may be provided in the form of a force, a pressure, temperature, light, and/or the like.

While the figures show first, second, and third directional axes DR1, DR2, and DR3, the directions indicated by the first, second, and third directional axes DR1, DR2, and DR3 may be relative to one another and may be variously modified to other suitable directions. In addition, the directions indicated by the first, second, and third directional axes DR1, DR2, and DR3 may be referred to as first, second, and third directions, respectively, and may be assigned with the same reference symbols as those of the first, second, and third directional axes DR1, DR2, and DR3.

The first display surface FS of the display device ED may include the first active area F-AA and the first peripheral area F-NAA. The first active area F-AA may be activated in response to the electrical signals. The display device ED may display the image IM through the first active area F-AA, and various external inputs may be sensed through the first active area F-AA. The first peripheral area F-NAA may be defined to be adjacent to the first active area F-AA. The first peripheral area F-NAA may have a suitable color (e.g., a predetermined color). The first peripheral area F-NAA may surround (e.g., around a periphery of) the first active area F-AA. Accordingly, the first active area F-AA may have a shape that is defined or substantially defined by the first peripheral area F-NAA, but this is merely provided as one example, and thus, the present disclosure is not limited thereto. For example, the first peripheral area F-NAA may be defined to be adjacent to only one side of the first active area F-AA, or may be omitted as needed or desired. According to an embodiment, the display device ED may include the active area having various suitable shapes, and thus, is not particularly limited to any one shape.

The display device ED may include a folding area FA1, and non-folding areas NFA1 and NFA2. The display device ED may include a plurality of non-folding areas NFA1 and NFA2. According to an embodiment, the display device ED may include a first non-folding area NFA1, and a second non-folding area NFA2 spaced apart from the first non-folding area NFA1 with the folding area FA1 interposed therebetween. While FIGS. 1A to 1C show the display device ED including one folding area FA1 as a representative example, the display device ED is not limited thereto or thereby. According to an embodiment, the display device ED may include a plurality of folding areas.

Referring to FIG. 1B, the display device ED may be folded with respect to a first folding axis FX1. The first folding axis FX1 may be an imaginary axis extending in the first directional axis DR1 to be parallel to or substantially parallel to a direction in which a long side of the display device ED extends. The first folding axis FX1 may extend in the first directional axis DR1 at (e.g., in or on) the first display surface FS.

According to the present embodiment, the non-folding areas NFA1 and NFA2 may be disposed to be adjacent to each other with the folding area FA1 interposed therebetween. For example, the first non-folding area NFA1 may be disposed to be adjacent to one side (e.g., a left side according to the orientation shown in the figures) of the folding area FA1 in the second directional axis DR2, and the second non-folding area NFA2 may be disposed to be adjacent to the other side (e.g., an opposite side or a right side according to the orientation shown in the figures) of the folding area FA1 in the second directional axis DR2.

The display device ED may be folded about (e.g., relative to) the first folding axis FX1 to be in the inwardly folded (e.g., in-folding) state, where one area of the first display surface FS, which overlaps with the first non-folding area NFA1, faces another area of the first display surface FS, which overlaps with the second non-folding area NFA2.

In this case, the second display surface RS may be viewed by the user when the display device ED is in the inwardly folded state. The second display surface RS may further include the electronic module area EMA at (e.g., in or on) which an electronic module (e.g., an electronic device or an electronic sensor) including various suitable components is disposed.

Referring to FIG. 1C, the display device ED may be folded about (e.g., relative to) the folding axis FX1 to be in an outwardly folded (e.g., out-folding) state, where one area of the second display surface RS, which overlaps with the first non-folding area NFA1, faces another area of the second display surface RS, which overlaps with the second non-folding area NFA2.

However, the present disclosure is not limited thereto or thereby. For example, the display device ED may be folded about (e.g., relative to) a plurality of folding axes, such that a portion of the first display surface FS and a portion of the second display surface RS may face each other, and the number of the folding axes and the number of the non-folding areas are not particularly limited.

Various suitable electronic modules (e.g., electronic devices or sensors) may be disposed at (e.g., in or on) the electronic module area EMA. For example, the electronic module may include at least one of a camera, a speaker, an optical sensor, or a thermal sensor. An external object may be sensed through the electronic module area EMA of the first display surface FS or the second display surface RS, or a sound signal, for example, such as a voice, may be provided to the outside through the electronic module area EMA of the first display surface FS or the second display surface RS. In addition, the electronic module may include a plurality of suitable components, but is not limited to any particular embodiments.

The electronic module area EMA may be surrounded (e.g., around a periphery thereof) by the first active area F-AA and the first peripheral area F-NAA, but the present disclosure is not limited thereto or thereby. The electronic module area EMA may be defined in the first active area F-AA, but the present disclosure is not particularly limited thereto.

Figure 2A:
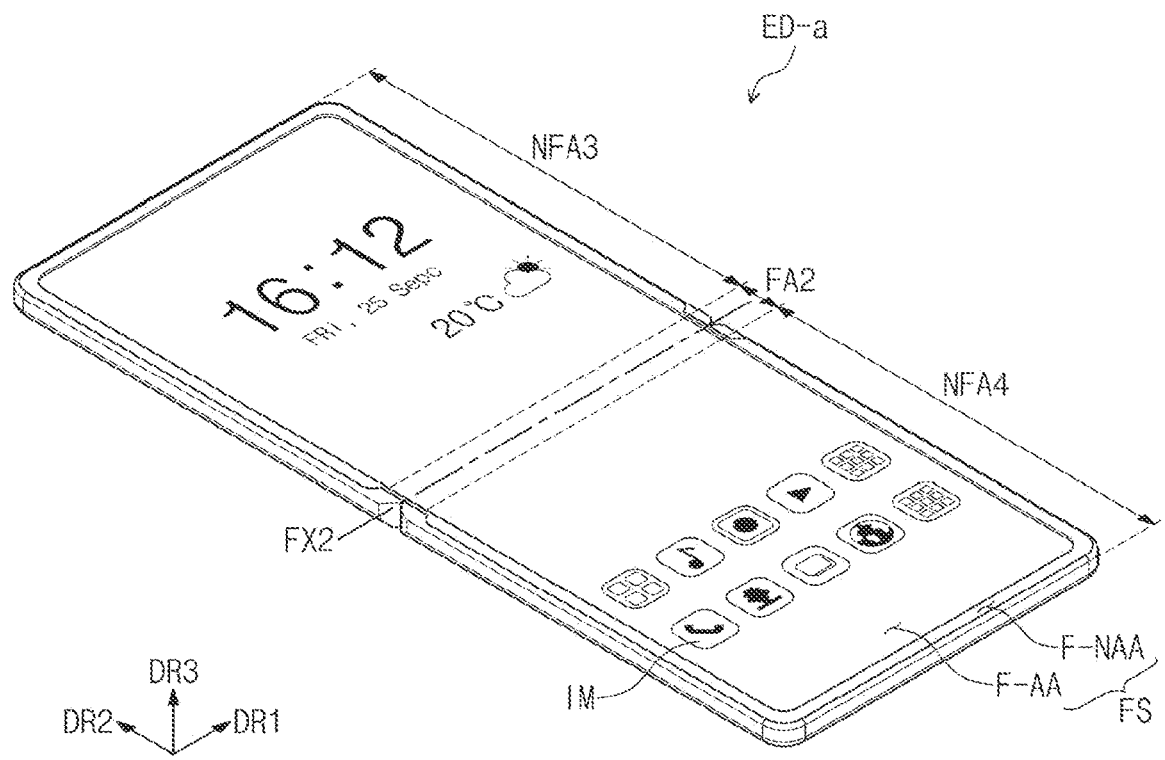
FIG. 2A is a perspective view showing a display device in an unfolded state according to an embodiment of the present disclosure.
Figure 2B:
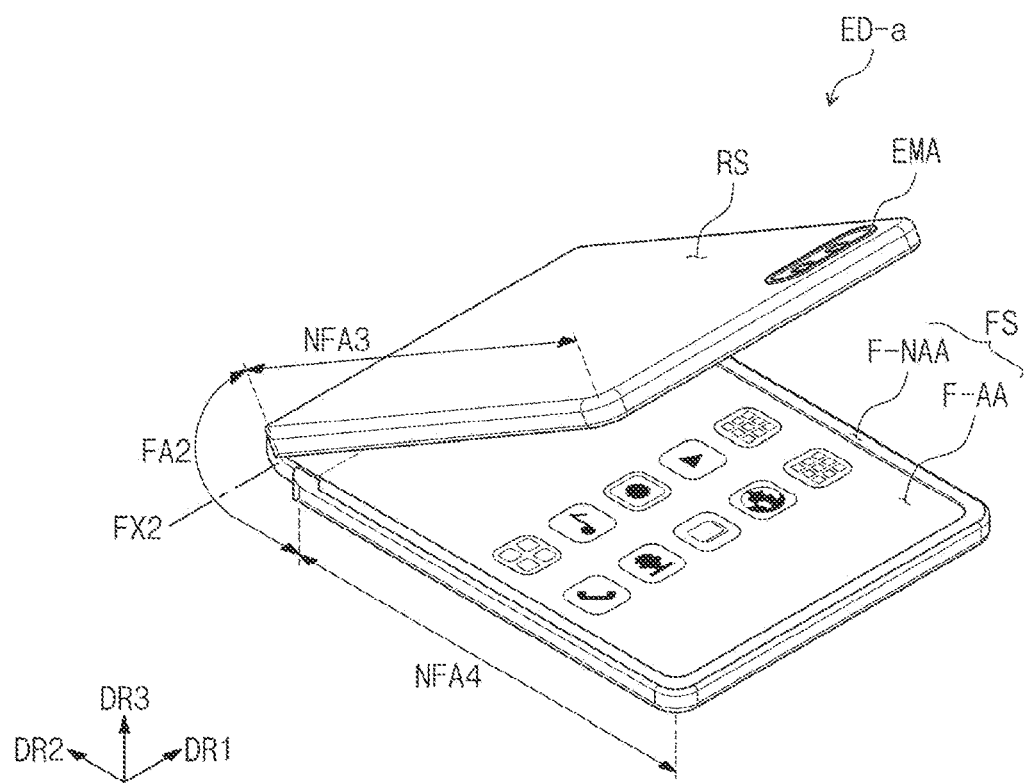
FIG. 2B is a perspective view showing the display device of FIG. 2A being inwardly folded according to an embodiment of the present disclosure.

FIG. 2A is a perspective view showing a display device ED-a in an unfolded state according to an embodiment of the present disclosure. FIG. 2B is a perspective view showing the display device ED-a of FIG. 2A being inwardly folded according to an embodiment of the present disclosure.

The display device ED-a may be folded with respect to a second folding axis FX2 extending in a direction that is parallel to or substantially parallel to the first directional axis DR1. In FIG. 2B, the second folding axis FX2 extends parallel to or substantially parallel to a direction in which a short side of the display device ED-a extends, but the present disclosure is not limited thereto or thereby.

According to an embodiment, the display device ED-a may include at least one folding area FA2, and non-folding areas NFA3 and NFA4 defined to be adjacent to the folding area FA2. The non-folding areas NFA3 and NFA4 may be spaced apart from each other with the folding area FA2 interposed therebetween.

The folding area FA2 may have a suitable curvature (e.g., a predetermined curvature), and a radius of curvature. According to an embodiment, the display device ED-a may be inwardly folded (e.g., in-folding), such that a first non-folding area NFA3 and a second non-folding area NFA4 may face each other, and a first display surface FS may not be exposed to the outside.

In addition, different from the display device ED-a shown in FIGS. 2A and 2B, the display device may be outwardly folded (e.g., out-folding), such that the first display surface FS may be exposed to the outside.

The first display surface FS may be viewed by the user in the unfolded state of the display device ED-a, and a second display surface RS may be viewed by the user in the inwardly folded state. The second display surface RS may include an electronic module area EMA in which an electronic module (e.g., an electronic device or an electronic sensor) including various suitable components is disposed.

According to an embodiment, the display device ED-a may include the second display surface RS, and the second display surface RS may be defined as a surface opposite to at least a portion of the first display surface FS. In the inwardly folded (e.g., in-folding) state of the display device ED-a, the second display surface RS may be viewed by the user. The second display surface RS may include the electronic module area EMA in which the electronic module including various suitable components is disposed. According to an embodiment, an image may be provided through the second display surface RS.

The display devices ED and ED-a may be configured to repeat the unfolding operation and the in-folding operation, or to repeat the unfolding operation and the out-folding operation, however, the present disclosure is not limited thereto or thereby. According to an embodiment, the display devices ED and ED-a may be selectively operated in any one of the unfolding operation, the in-folding operation, and the out-folding operation.

Figure 3:
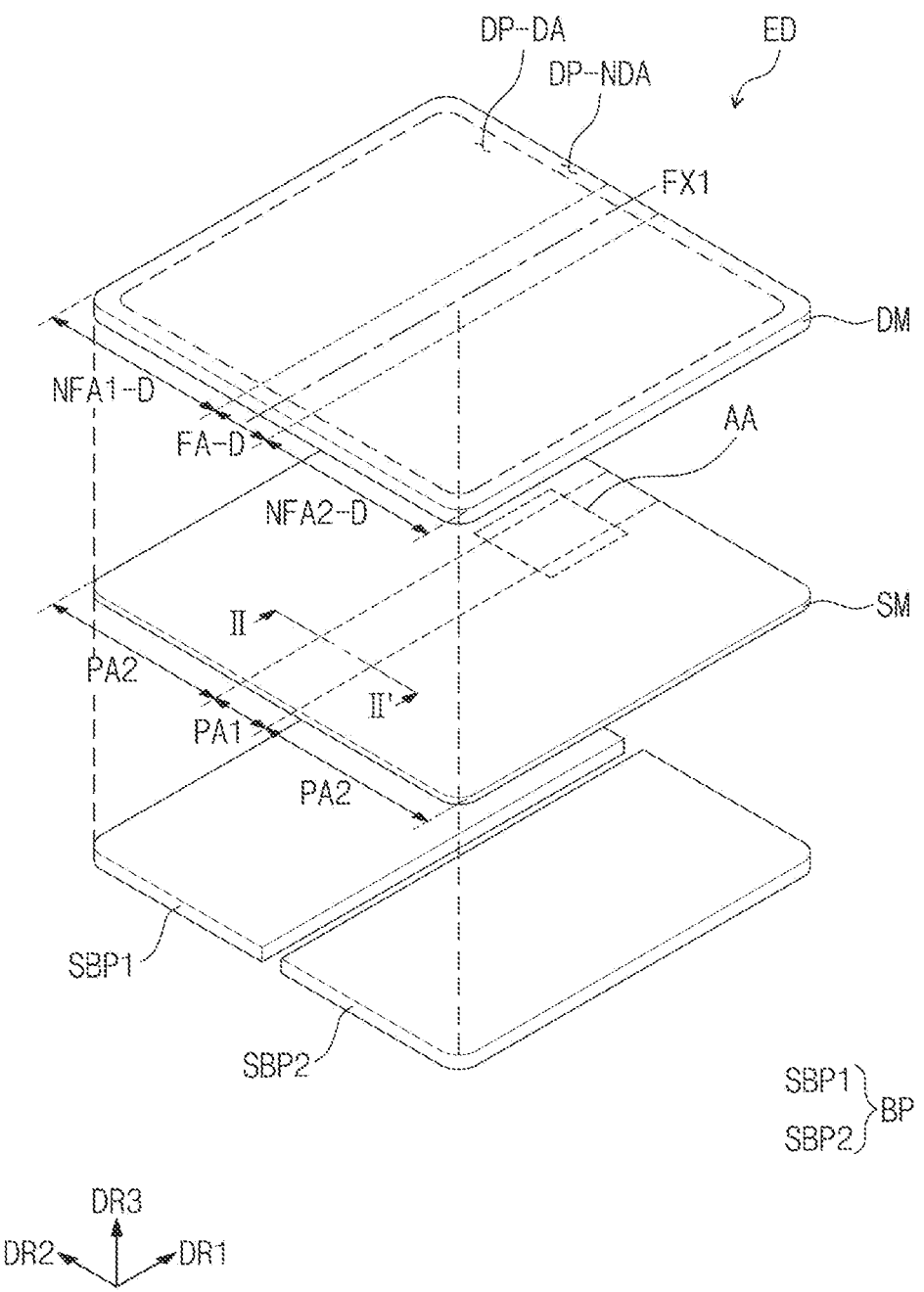
FIG. 3 is an exploded perspective view showing a display device according to an embodiment of the present disclosure.
Figure 4:
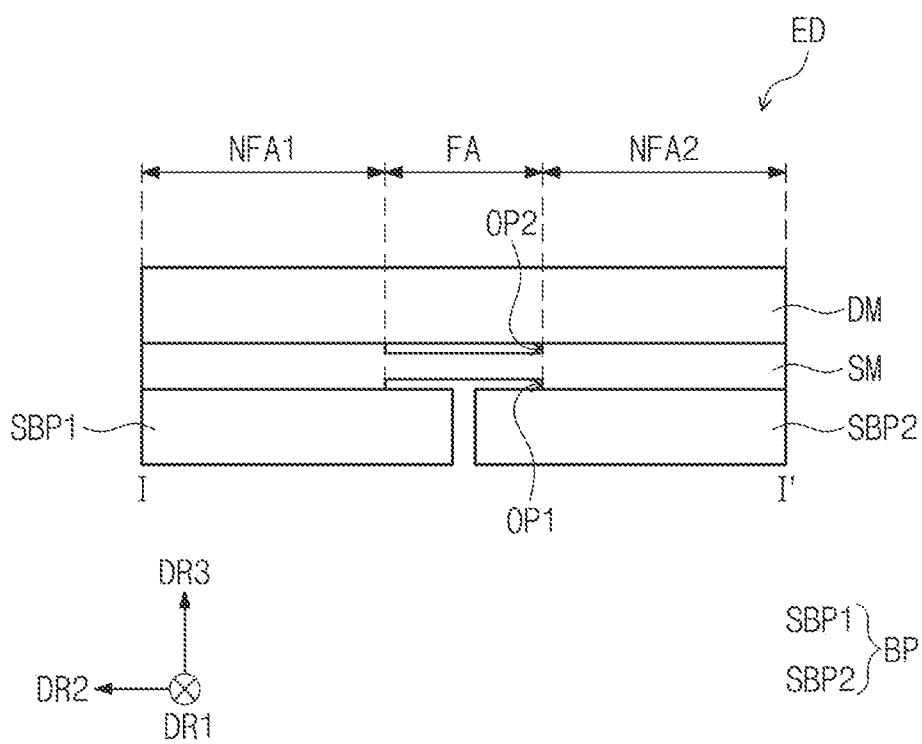
FIG. 4 is a cross-sectional view showing a display device according to an embodiment of the present disclosure.

FIG. 3 is an exploded perspective view showing the display device ED according to an embodiment of the present disclosure. FIG. 4 is a cross-sectional view showing the display device ED according to an embodiment of the present disclosure. FIG. 3 shows the exploded perspective view of the display device shown in FIG. 1A. FIG. 4 shows the cross-sectional view taken along the line I-I' of FIG. 1A.

Referring to FIGS. 3 and 4, the display device ED may include a display module (e.g., a display or a display layer) DM, and a support module (e.g., a support or a support structure) SM disposed under (e.g., underneath) the display module DM. In addition, the display device ED may further include a base substrate BP disposed under (e.g., underneath) the support module SM.

The display module DM of the display device ED may display the image in response to the electrical signals, and may transmit/receive information about the external input. The display module DM may include a display area DP-DA and a non-display area DP-NDA. The non-display area DP-NDA may be defined to be adjacent to the display area DP-DA. For example, the non-display area DP-NDA may surround (e.g., around a periphery of) the display area DP-DA. However, the present disclosure is not limited thereto, and this is merely provided as one example. The non-display area DP-NDA may be defined in various suitable shapes, and is not particularly limited to any one shape. According to an embodiment, the display area DP-DA of the display module DM may correspond to (e.g., may overlap with) at least a portion of the first active area F-AA.

The display module DM may include a display panel, and an input sensor disposed on the display panel. The display panel may include a display element layer. For example, the display element layer may include an organic electroluminescent element, a quantum dot light emitting element, or a liquid crystal element, but the present disclosure is not limited thereto or thereby.

The display module DM may further include an optical layer disposed on the input sensor. The optical layer may reduce a reflection of external light. As an example, the optical layer may include a polarizing layer or a color filter layer.

The display module DM of the display device ED may include a folding display portion FA-D, and non-folding display portions NFA1-D and NFA2-D. The folding display portion FA-D may correspond to the folding area FA1, and the non-folding display portions NFA1-D and NFA2-D may correspond to the non-folding areas NFA1 and NFA2 (e.g., refer to FIG. 1A).

The folding display portion FA-D may be folded and/or bent with respect to the first folding axis FX1. The display module DM may include a first non-folding display portion NFA1-D and a second non-folding display portion NFA2-D, and the first non-folding display portion NFA1-D and the second non-folding display portion NFA2-D may be spaced apart from each other with the folding display portion FA-D interposed therebetween.

The support module SM may be disposed under (e.g., underneath) the display module DM. The support module SM may support the display module DM.

The support module SM of the display device ED may include a first portion PA1 and a second portion PA2. The first portion PA1 may correspond to the folding area FA1, and the second portion PA2 may correspond to the non-folding areas NFA1 and NFA2 (e.g., refer to FIG. 1A).

The support module SM may be provided with openings OP1 and OP2 at (e.g., in or on) the first portion PA1 that are defined in upper and lower portions of the support module SM, respectively. In other words, the openings OP1 and OP2 may overlap with the folding area FA (e.g., refer to FIG. 1A). As the openings OP1 and OP2 are defined in the support module SM, a repulsive force of the support module SM, which may be caused when the display device ED is folded, may be reduced. As shown in FIG. 4, the first opening OP1 defined in the lower portion of the support module SM and the second opening OP2 defined in the upper portion of the support module SM have the same or substantially the same width in the second direction DR2 as each other, but the present disclosure is not limited thereto or thereby. As an example, in an embodiment, the width in the second direction DR2 of the first opening OP1 may be different from the width in the second direction DR2 of the second opening OP2.

The base substrate BP may be disposed under (e.g., underneath) the support module SM. The base substrate BP may support the support module SM. The base substrate BP may include a first sub-base substrate SBP1 and a second sub-base substrate SBP2.

The first sub-base substrate SBP1 and the second sub-base substrate SBP2 may be spaced apart from each other in the second direction DR2. The first sub-base substrate SBP1 may overlap with the folding area FA and the first non-folding area NFA1, and the second sub-base substrate SBP2 may overlap with the folding area FA and the second non-folding area NFA2.

The base substrate BP may include a cushion layer that absorbs an external impact applied thereto to protect components disposed on the base substrate BP from the external impact. The cushion layer may prevent or substantially prevent the support member SM from being pressed and plastic-deformed by the external impact and force. The cushion layer may include a sponge, a foam, or an elastomer, for example, such as a urethane resin. In addition, the cushion layer may include at least one of an acrylic-based polymer, a urethane-based polymer, a silicon-based polymer, or an imide-based polymer, but the present disclosure is not limited thereto or thereby.

Figure 5:
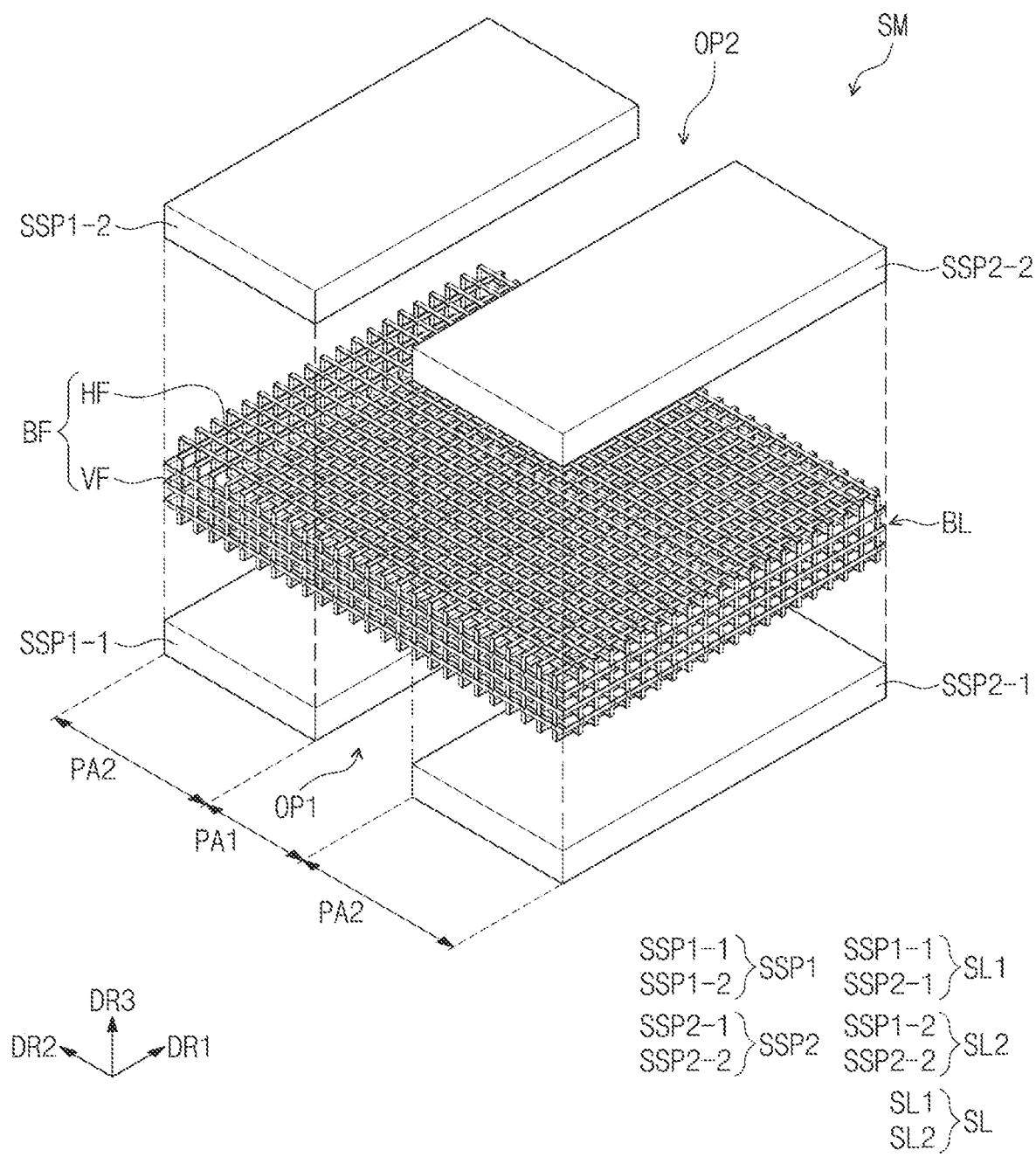
FIG. 5 is an exploded perspective view showing a support module according to an embodiment of the present disclosure.
Figure 6:
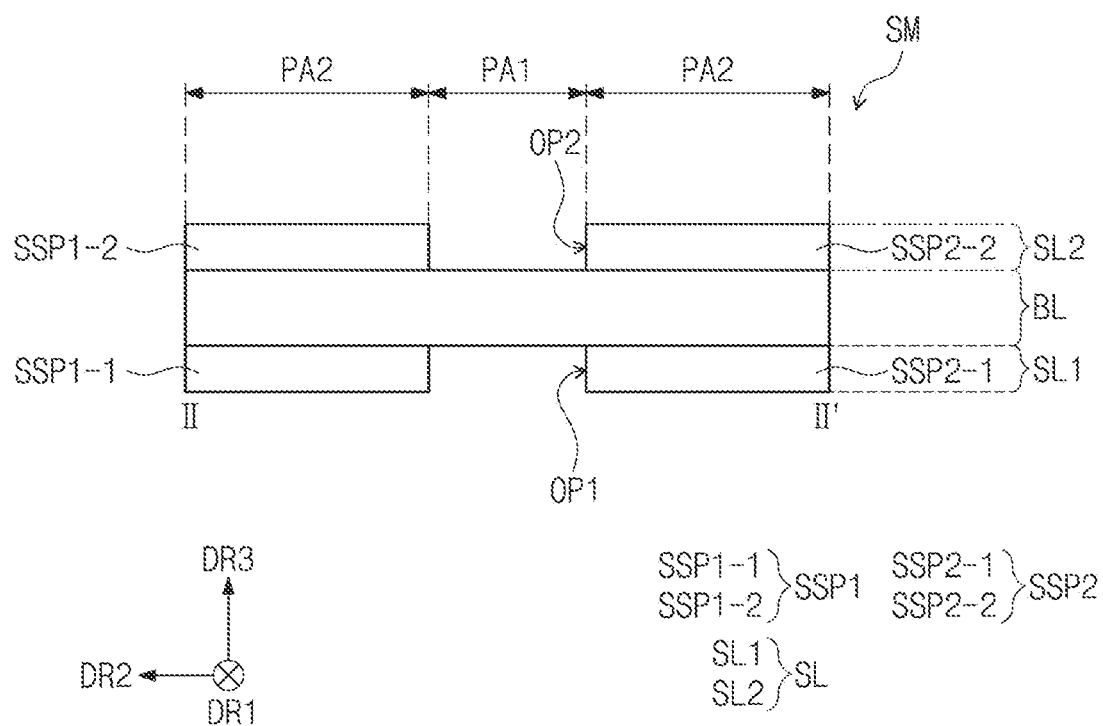
FIG. 6 is a cross-sectional view showing a support module according to an embodiment of the present disclosure.
Figure 7:
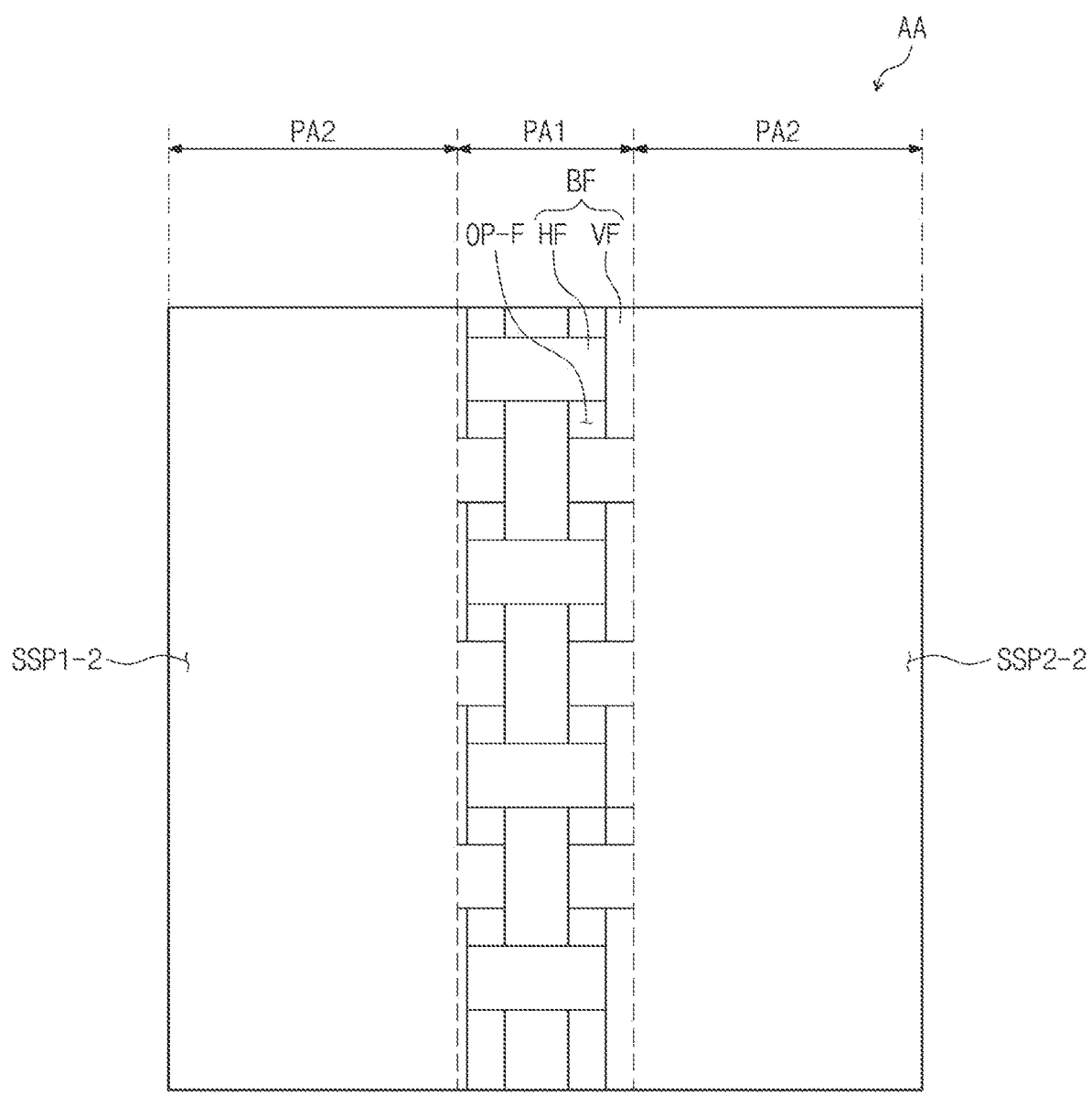
FIG. 7 is an enlarged plan view showing a portion of a support module according to an embodiment of the present disclosure.

FIG. 5 is an exploded perspective view showing the support module SM according to an embodiment of the present disclosure. FIG. 6 is a cross-sectional view showing the support module SM according to an embodiment of the present disclosure. FIG. 7 is an enlarged plan view showing a portion of the support module according to an embodiment of the present disclosure. FIG. 5 shows the exploded perspective view of the support module SM shown in FIG. 3. FIG. 6 shows the cross-sectional view taken along the line II-II' of FIG. 3. FIG. 7 shows the enlarged plan view of the portion AA shown in FIG. 3.

Referring to FIGS. 5 to 7, the display device ED (e.g., refer to FIG. 4) may include the support module SM. The support module SM may include a base layer BL, and a support layer SL disposed on each of upper and lower portions of the base layer BL. In other words, the support module SM may have a structure in which a first support layer SL1, the base layer BL, and a second support layer SL2 are sequentially stacked in the third direction DR3. The base layer BL may be covered by the support layer SL in an area corresponding to the second portion PA2, and may be exposed in an area corresponding to the first portion PA1 without being covered by the support layer SL.

The base layer BL may include a base fiber BF. The base fiber BF may include a glass fiber, a carbon fiber, or an aramid fiber, but is not particularly limited thereto.

The support layer SL may include a first sub-support portion SSP1 and a second sub-support portion SSP2. The first sub-support portion SSP1 and the second sub-support portion SSP2 may be disposed at (e.g., in or on) the second portion PA2. The first sub-support portion SSP1 may include a lower first sub-support portion SSP1-1 disposed under (e.g., underneath) the base layer BL, and an upper first sub-support portion SSP1-2 disposed on (e.g., above) the base layer BL. The second sub-support portion SSP2 may include a lower second sub-support portion SSP2-1 disposed under (e.g., underneath) the base layer BL, and an upper second sub-support portion SSP2-2 disposed on (e.g., above) the base layer BL.

The first sub-support portion SSP1 and the second sub-support portion SSP2 may be spaced apart from each other in the second direction DR2. The support layer SL may be provided with the openings OP1 and OP2 defined in the first portion PA1.

The openings OP1 and OP2 may be defined through the upper and lower portions, respectively, of the support module SM in the third direction DR3. The first opening OP1 may be defined between the lower first sub-support portion SSP1-1 and the lower second sub-support portion SSP2-1. The second opening OP2 may be defined between the upper first sub-support portion SSP1-2 and the upper second sub-support portion SSP2-2. The second opening OP2 may overlap with the first opening OP1. As shown in FIG. 6, the first opening OP1 and the second opening OP2 may have the same or substantially the same width as each other in the second direction DR2, but the present disclosure is not limited thereto or thereby. For example, the first opening OP1 and the second opening OP2 may have different widths from each other in the second direction DR2.

In addition, each of the first opening OP1 and the second opening OP2 shown in FIG. 6 may be defined to have an angled form (e.g., a sharp angled step portion), but the present disclosure is not limited thereto or thereby. As an example, the first opening OP1 and the second opening OP2 may have a curved portion.

The first sub-support portion SSP1 and the second sub-support portion SSP2 may include a support portion resin. The support portion resin may have a modulus greater than or equal to about $10^3$ Mpa and less than or equal to about $10^4$ Mpa at a temperature of about −20° C. When the modulus of the support portion resin is smaller than about $10^3$ Mpa, an impact resistance of the support layer SL may be reduced, and when the modulus of the support portion resin is greater than about $10^4$ Mpa, flexibility of the support portion resin may be deteriorated.

The support portion resin may include at least one of an acrylic resin, an epoxy resin, or a urethane resin. As an example, the support portion resin may include at least one of the acrylic resin, the epoxy resin, or the urethane resin, may include two resins selected from among the acrylic resin, the epoxy resin, and the urethane resin, or may include all of the acrylic resin, the epoxy resin, and the urethane resin.

The first sub-support portion SSP1 and the second sub-support portion SSP2 may include the same or substantially the same support portion resin as each other, but the present disclosure is not limited thereto or thereby. In some embodiments, the first sub-support portion SSP1 and the second sub-support portion SSP2 may include different support portion resins from each other.

The base layer BL may include the base fiber BF including a plurality of vertical fibers VF extending in the first direction DR1, and a plurality of horizontal fibers HF extending in the second direction DR2. The vertical fibers VF may cross the horizontal fibers HF. The vertical fibers VF may be interlaced with the horizontal fibers HF, and may extend in the first direction DR1. The horizontal fibers HF may be interlaced with the vertical fibers VF, and may extend in the second direction DR2.

FIG. 5 shows a structure in which the vertical fibers VF and the horizontal fibers HF of the base layer BL are formed in a single layer, but the present disclosure is not limited thereto or thereby. As an example, the base layer BL may include a plurality of layers formed of the vertical fibers VF and the horizontal fibers HF.

In addition, the vertical fibers VF and the horizontal fibers BF shown in FIGS. 5 and 7 have the same or substantially the same thickness as each other, but the present disclosure is not limited thereto or thereby. As an example, the thickness of the vertical fibers VF may be different from the thickness of the horizontal fibers BF.

A fiber opening OP-F may be defined between the vertical fibers VF that are adjacent to each other and the horizontal fibers HF that are adjacent to each other. In FIGS. 5 and 7, the fiber opening OP-F is shown as having a square shape, but the shape of the fiber opening OP-F is not limited to the square shape. As an example, the fiber opening OP-F may have a rectangular shape, a polygonal shape, a circular shape, or an oval shape.

Referring to FIGS. 5 and 7, the base layer BL may have a structure in which a fiber resin is not filled in the fiber opening OP-F at (e.g., in or on) the first portion PA1 and the second portion PA2 of the base layer BL, but the present disclosure is not limited thereto or thereby. As an example, according to an embodiment, the base layer BL may have a structure in which the fiber resin is filled in the fiber opening OP-F at (e.g., in or on) the second portion PA2. The fiber resin may be the same or substantially the same resin as the support portion resin. As an example, the fiber resin may include at least one of an acrylic resin, an epoxy resin, or a urethane resin.

In addition, while FIGS. 5 and 7 show that the base fiber BF may be in a woven form, the present disclosure is not limited thereto or thereby. As an example, the base fiber BF may have a structure in which fibers extending in one direction are dispersed and arranged in a resin matrix. The fibers extending in one direction may have a width smaller than a width in the one direction of the first and second sub-support portions SSP1 and SSP2. The resin matrix may include a polyimide-based resin or a polypropylene-based resin.

FIGS. 8 to 12 are cross-sectional views showing support modules SM-1, SM-2, SM-3, SM-4, and SM-5 according to embodiments of the present disclosure. FIGS. 8 to 12 show cross-sectional views taken along the line II-II' of FIG. 3. In FIGS. 8 to 12, the same reference symbols are used to denote the same or substantially the same elements as those described above with reference to FIGS. 1A to 7, and thus, redundant description thereof may not be repeated.

Figure 8:
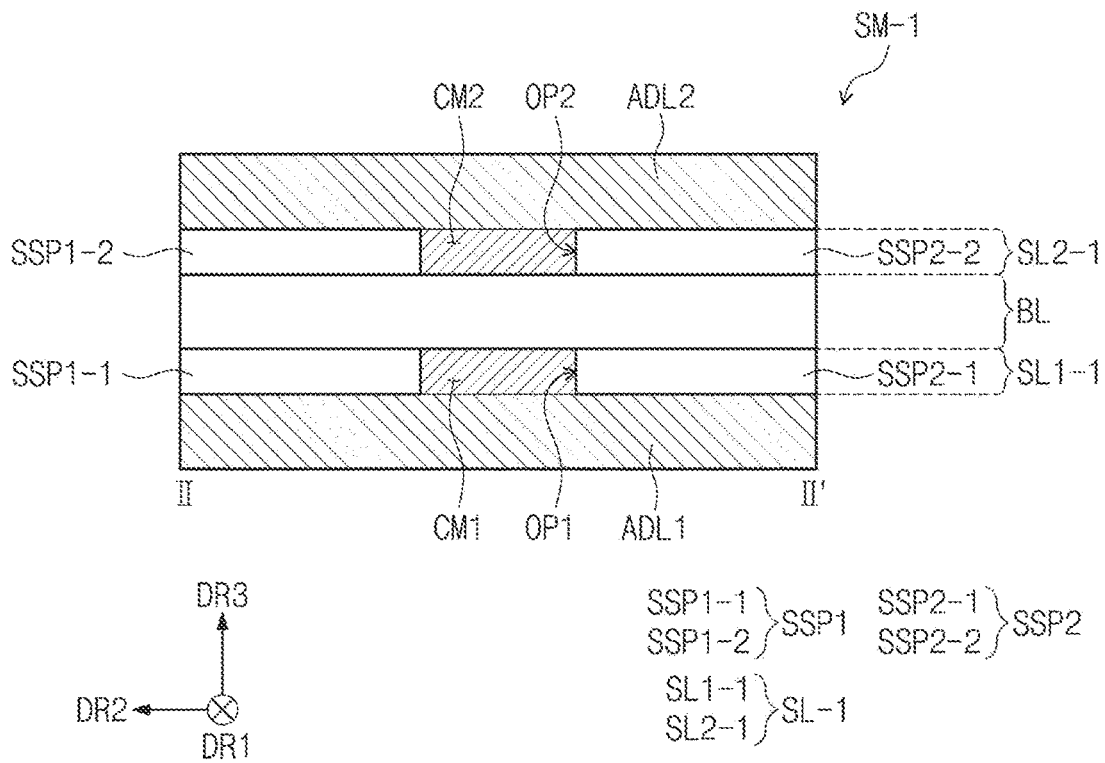
FIG. 8 is a cross-sectional view showing a support module according to an embodiment of the present disclosure.

When compared with the support module SM shown in FIG. 6, the support module SM-1 shown in FIG. 8 may further include filling portions CM1 and CM2 disposed between a first sub-support portion SSP1 and a second sub-support portion SSP2 to correspond to the folding area FA (e.g., refer to FIG. 1A).

In more detail, referring to FIG. 8, the support module SM-1 may further include the filling portions CM1 and CM2 disposed at (e.g., in or on) the folding area FA (e.g., refer to FIG. 1A) between the first sub-support portion SSP1 and the second sub-support portion SSP2. The filling portions CM1 and CM2 may be filled in the openings OP1 and OP2. The filling portions CM1 and CM2 may include a first filling portion CM1 and a second filling portion CM2. The first filling portion CM1 may be filled in the first opening OP1, and the second filling portion CM2 may be filled in the second opening OP2. In other words, a support layer SL-1 may further include the filling portions CM1 and CM2 filled in the openings OP1 and OP2, respectively.

In FIG. 8, each of the filling portions CM1 and CM2 is shown as having a single-layer structure, but the present disclosure is not limited thereto or thereby. For example, each of the filling portions CM1 and CM2 may include multiple layers. As an example, both the first filling portion CM1 and the second filling portion CM2 may include the multiple layers, or one of the first filling portion CM1 and the second filling portion CM2 may include the multiple layers. In the case where each of the filling portions CM1 and CM2 includes the multiple layers, the multiple layers may include the same or substantially the same material as one another, or at least one of the layers may include a material different from that of the others.

In addition, while FIG. 8 shows a structure in which the filling portions CM1 and CM2 are disposed in the first opening OP1 and the second opening OP2, respectively, the present disclosure is not limited thereto or thereby. As an example, according to an embodiment, in the support module SM-1, the first opening OP1 may be filled with the first filling portion CM1, and the second opening OP2 may not be filled with the second filling portion CM2. As another example, according to an embodiment, the second opening OP2 may be filled with the second filling portion CM2, and the first opening OP1 may not be filled with the first filling portion CM1.

The filling portions CM1 and CM2 may have a modulus smaller than that of a support portion resin. As an example, the filling portions CM1 and CM2 may include at least one of silicone, acrylate, or urethane. The filling portions CM1 and CM2 and the support portion resin may contain materials of the same or substantially the same kind as each other. In the case where the filling portions CM1 and CM2 and the support portion resin contain the materials of the same or substantially the same kind as each other, a resin used to form the filling portions CM1 and CM2 may have a chemical structure different from that of the support portion resin, and thus, may have different physical properties from those of the support portion resin. According to an embodiment, because the support module SM-1 includes the filling portions CM1 and CM2 disposed at (e.g., in or on) the folding area FA (e.g., refer to FIG. 1A) and having the modulus smaller than that of the support portion resin, the repulsive force that may be generated during the folding operation of the display device may be reduced, and thus, the flexibility of the display device may be improved.

Still referring to FIG. 8, the support module SM-1 may further include adhesive layers ADL1 and ADL2 disposed on lower and upper portions, respectively, of the support layer SL-1. In other words, the support module SM-1 may include a first adhesive layer ADL1 disposed on the lower portion of the support layer SL-1, and a second adhesive layer ADL2 disposed on the upper portion of the support layer SL-1. The adhesive layers ADL1 and ADL2 may be disposed at a lowermost position and an uppermost position, respectively, of the support module SM-1 to planarize or substantially planarize the upper and lower portions of the support module SM-1. In FIG. 8, the first adhesive layer ADL1 and the second adhesive layer ADL2 have the same or substantially the same thickness as each other, but the present disclosure is not limited thereto or thereby. According to an embodiment, the first adhesive layer ADL1 and the second adhesive layer ADL2 may have different thicknesses from each other.

The adhesive layers ADL1 and ADL2 may attach the base substrate BP (e.g., refer to FIG. 3) disposed under (e.g., underneath) the support module SM-1 to the support module SM-1, and the display module DM (e.g., refer to FIG. 3) disposed on (e.g., above) the support module SM-1 to the support module SM-1, respectively. However, the present disclosure is not limited thereto or thereby. According to an embodiment, the display module DM disposed on the support module SM-1 and the base substrate BP disposed under (e.g., underneath) the support module SM-1 may be disposed directly on the support module SM-1 without the adhesive layers ADL1 and ADL2.

In FIG. 8, each of the adhesive layers ADL1 and ADL2 is shown as having a single-layer structure, but the present disclosure is not limited thereto or thereby. According to an embodiment, each of the adhesive layers ADL1 and ADL2 may include multiple layers. As an example, both the first adhesive layer ADL1 and the second adhesive layer ADL2 may include the multiple layers, or one of the first adhesive layer ADL1 and the second adhesive layer ADL2 may include the multiple layers. In the case where both the adhesive layers ADL1 and ADL2 include the multiple layers, the multiple layers may include the same or substantially the same material as one another, or at least one of the multiple layers may include a material different from that of another.

The adhesive layers ADL1 and ADL2 may include at least one of silicone, acrylate, or urethane. The adhesive layers ADL1 and ADL2 may include the same or substantially the same materials as those of the filling portions CM1 and CM2, but the present disclosure is not limited thereto or thereby. According to an embodiment, the adhesive layers ADL1 and ADL2 may include a material different from those of the filling portions CM1 and CM2.

The adhesive layers ADL1 and ADL2 may be integrally formed with the filling portions CM1 and CM2. In other words, the first adhesive layer ADL1 may be integrally formed with the first filling portion CM1, and the second adhesive layer ADL2 may be integrally formed with the second filling portion CM2. As an example, the adhesive layers ADL1 and ADL2 and the filling portions CM1 and CM2 may be formed of the same material as each other through the same or substantially the same process (e.g., through a single process), but the present disclosure is not limited thereto or thereby. As an example, the adhesive layers ADL1 and ADL2 may be formed separately from the filling portions CM1 and CM2. In other words, the adhesive layers ADL1 and ADL2 and the filling portions CM1 and CM2 may be formed using the same or substantially the same material as each other through different processes, or the adhesive layers ADL1 and ADL2 and the filling portions CM1 and CM2 may be formed using different materials from each other through different processes.

The display device may include the support module SM-1 that further includes the adhesive layers ADL1 and ADL2 and the filling portions CM1 and CM2, and thus, the impact resistance and durability of the display device may be improved.

Figure 9:
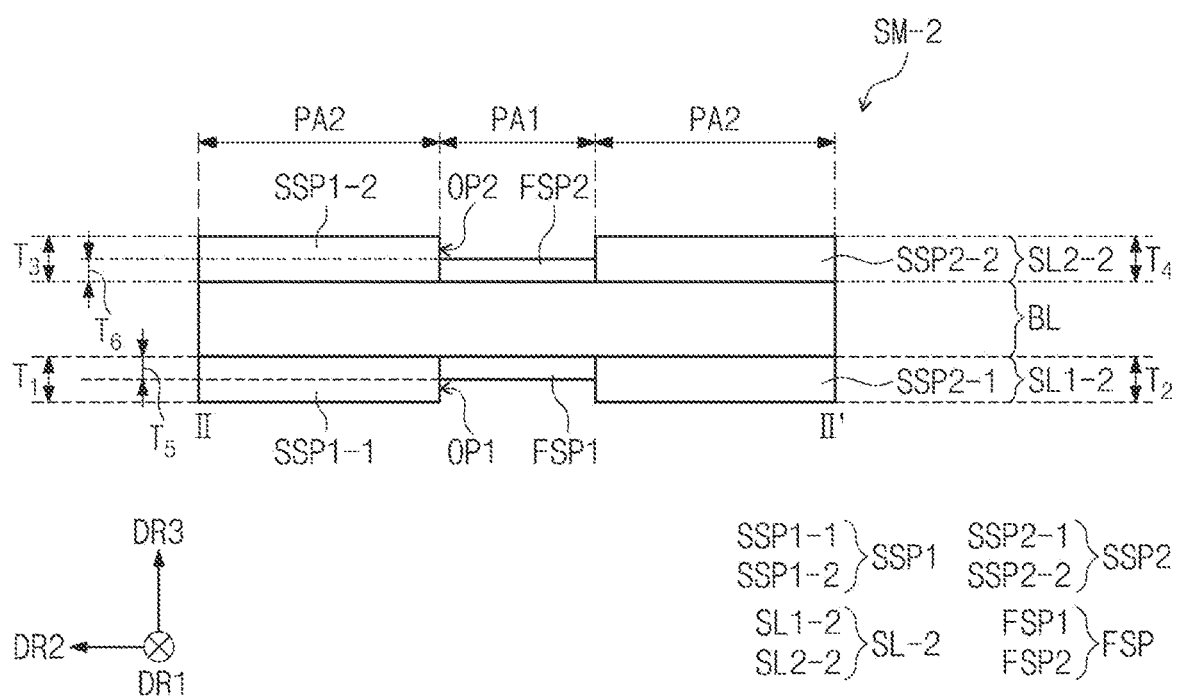
FIG. 9 is a cross-sectional view showing a support module according to an embodiment of the present disclosure.

Referring to FIG. 9, when compared with the support module SM shown in FIG. 6, the support module SM-2 shown in FIG. 9 may further include folding support portions FSP1 and FSP2 disposed at (e.g., in or on) the folding area FA (e.g., refer to FIG. 1A) between a first sub-support portion SSP1 and a second sub-support portion SSP2.

In more detail, referring to FIG. 9, the support module SM-2 may further include the folding support portions FSP1 and FSP2 disposed at (e.g., in or on) the folding area FA (e.g., refer to FIG. 1A) between the first sub-support portion SSP1 and the second sub-support portion SSP2. In other words, the support module SM-2 may have a structure in which a lower folding support portion FSP1, a base layer BL, and an upper folding support portion FSP2 are sequentially stacked along the third direction DR3 at (e.g., in or on) a first portion PA1, but the present disclosure is not limited thereto or thereby. As an example, the support module SM-2 may further include the lower folding support portion FSP1 and may not include the upper folding support portion FSP2, or the support module SM-2 may further include the upper folding support portion FSP2 and may not include the lower folding support portion FSP1.

The folding support portions FSP1 and FSP2 may have thicknesses $T_5$ and $T_6$, respectively, that are smaller than thicknesses $T_1$, $T_2$, $T_3$, and $T_4$ of the first sub-support portion SSP1 and the second sub-support portion SSP2. As an example, the thicknesses $T_1$ and $T_3$ of the first sub-support portion SSP1 may be the same or substantially the same as the thicknesses $T_2$ and $T_4$ of the second sub-support portion SSP2, and the thicknesses $T_5$ and $T_6$ of the folding support portions FSP1 and FSP2 may be smaller than the thicknesses $T_1$ and $T_3$ of the first sub-support portion SSP1 and the thicknesses $T_2$ and $T_4$ of the second sub-support portion SSP2. In other words, in a first support layer SL1-2 and a second support layer SL2-2, the thickness of the first portion PA1 may be smaller than the thickness of the second portion PA2. A ratio of the thicknesses $T_1$ and $T_3$ of the first sub-support portion SSP1, the thicknesses $T_5$ and $T_6$ of the folding support portions FSP1 and FSP2, and the thicknesses $T_2$ and $T_4$ of the second sub-support portion SSP2 may be from 5:4:5 to 8:4:8.

The display device may include the support module SM-2 that includes the folding support portions FSP1 and FSP2 having the thicknesses $T_5$ and $T_6$ that are smaller than the thicknesses $T_1$ to $T_4$ of the first sub-support portion SSP1 and the second sub-support portion SSP2 at (e.g., in or on) the first portion PA1. Thus, the repulsive force generated in the folding area FA (e.g., refer to FIG. 1A) during the folding operation of the display device may be reduced, and the flexibility of the display device may be improved.

Figure 10:
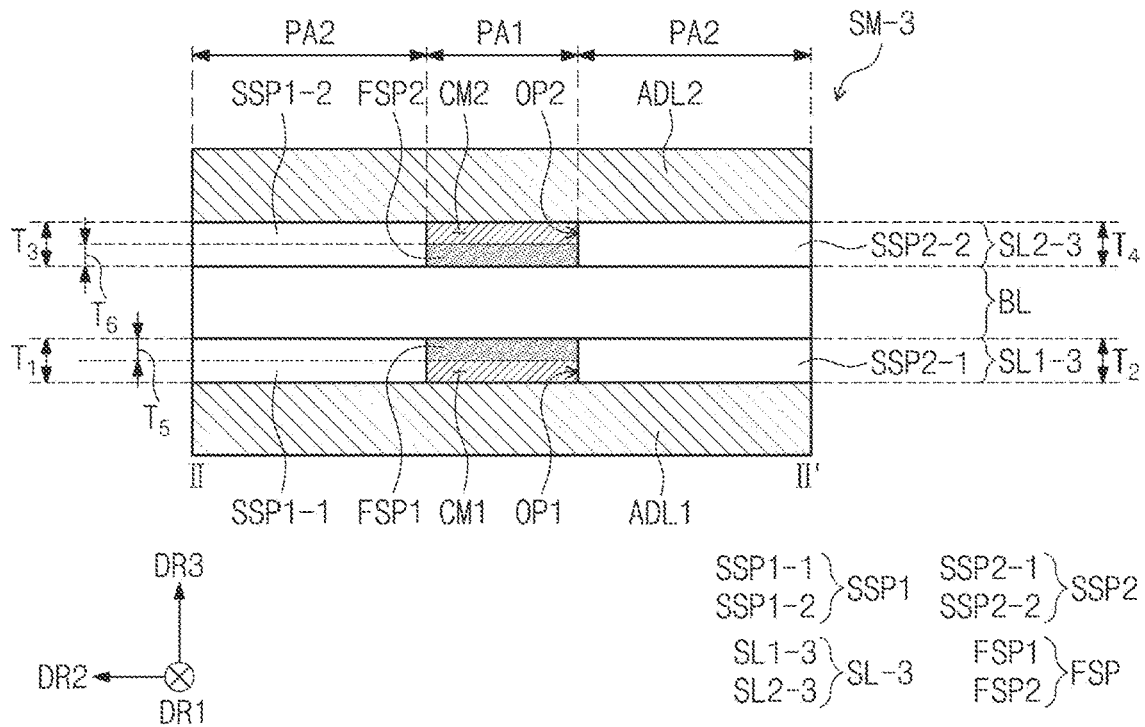
FIG. 10 is a cross-sectional view showing a support module according to an embodiment of the present disclosure.

Referring to FIG. 10, when compared with the support module SM-2 shown in FIG. 9, the support module SM-3 shown in FIG. 10 may further include filling portions CM1 and CM2 disposed between the first sub-support portion SSP1 and the second sub-support portion SSP2 and adhesive layers ADL1 and ADL2 disposed on and under a support layer SL-3, respectively.

In more detail, referring to FIG. 10, the support module SM-3 may further include the filling portions CM1 and CM2 disposed on the folding support portions FSP1 and FSP2, respectively, between the first sub-support portion SSP1 and the second sub-support portion SSP2. In other words, the folding support portions FSP1 and FSP2 may be disposed in the openings OP1 and OP2 defined in the support layer SL-3, respectively, and the filling portions CM1 and CM2 may be disposed on the folding support portions FSP1 and FSP2 in the openings OP1 and OP2, respectively.

The filling portions CM1 and CM2 may include a first filling portion CM1 and a second filling portion CM2. The first filling portion CM1 may be disposed on the first folding support portion FSP1 in the first opening OP1, and the second filling portion CM2 may be disposed on the second folding support portion FSP2 in the second opening OP2.

FIG. 10 shows a structure in which the first sub-support portion SSP1, the second sub-support portion SSP2, and the folding support portions FSP1 and FSP2 are formed on and under a base layer BL after being divided into a plurality of portions, but the present disclosure is not limited thereto or thereby. As an example, the portions of the first sub-support portion SSP1, the second sub-support portion SSP2, and the folding support portions FSP1 and FSP2 disposed on (e.g., above) the base layer BL may be integrally formed with each other, and the portions of the first sub-support portion SSP1, the second sub-support portion SSP2, and the folding support portions FSP1 and FSP2 disposed under (e.g., underneath) the base layer BL may be integrally formed with each other. In other words, a lower first sub-support portion SSP1-1, a lower second sub-support portion SSP2-1, and the first folding support portion FSP1 may be integrally formed with each other under (e.g., underneath) the base layer BL, and an upper first sub-support portion SSP1-2, an upper second sub-support portion SSP2-2, and the second folding support portion FSP2 may be integrally formed with each other on (e.g., above) the base layer BL. The first sub-support portion SSP1, the second sub-support portion SSP2, and the folding support portions FSP1 and FSP2 may be formed of the same material as each other through the same or substantially the same process.

The support module SM-3 may further include the filling portions CM1 and CM2 disposed on the folding support portions FSP1 and FSP2 between the first sub-support portion SSP1 and the second sub-support portion SSP2. The filling portions CM1 and CM2 may be filled in the openings OP1 and OP2. In other words, the support layer SL-3 may further include the filling portions CM1 and CM2 filled in the openings OP1 and OP2. The first filling portion CM1 may be filled in the first opening OP1, and the second filling portion CM2 may be filled in the second opening OP2.

In FIG. 10, each of the filling portions CM1 and CM2 is shown as having a single-layer structure, but the present disclosure is not limited thereto or thereby. According to an embodiment, at least one of the filling portions CM1 or CM2 may include multiple layers. As an example, each of the first filling portion CM1 and the second filling portion CM2 may include multiple layers, or one of the first filling portion CM1 or the second filling portion CM2 may include multiple layers. When each of the filling portions CM1 and CM2 includes multiple layers, the multiple layers may include the same or substantially the same material as one another, or at least one of the multiple layers may include a material different from that of another.

In addition, while FIG. 10 shows a structure in which the filling portions CM1 and CM2 are disposed in the first opening OP1 and the second opening OP2, the present disclosure is not limited thereto or thereby. As an example, the first opening OP1 may be filled with the first filling portion CM1, and the second opening OP2 may not be filled with the second filling portion CM2. As another example, the second opening OP2 may be filled with the second filling portion CM2, and the first opening OP1 may not be filled with the first filling portion CM1.

The filling portions CM1 and CM2 may have a modulus smaller than a modulus of a support portion resin. As an example, the filling portions CM1 and CM2 may include at least one of silicone, acrylate, or urethane. The filling portions CM1 and CM2 and the support portion resin may contain materials of the same or substantially the same kind as each other. In the case where the filling portions CM1 and CM2 and the support portion resin contain the materials of the same or substantially the same kind as each other, a resin used to form the filling portions CM1 and CM2 may have a chemical structure different from that of the support portion resin, and thus, may have different physical properties from those of the support portion resin. As the support module SM-3 of the display device includes the filling portions CM1 and CM2 having the modulus smaller than the modulus of the support portion resin in the folding area FA (e.g., refer to FIG. 1A), the repulsive force generated during the folding operation of the display device may be reduced, and thus, the flexibility of the display device may be improved.

The support module SM-3 may further include the adhesive layers ADL1 and ADL2 disposed under (e.g., underneath) and on (e.g., above) the support layer SL-3, respectively. The adhesive layers ADL1 and ADL2 may be respectively disposed at a lowermost position and an uppermost position of the support module SM-3 to planarize lower and upper portions of the support module SM-3, respectively.

The adhesive layers ADL1 and ADL2 may attach the base substrate BP disposed under (e.g., underneath) the support module SM-3 to the support module SM-3, and the display module DM disposed on (e.g., above) the support module SM-3 to the support module SM-3, respectively. The first adhesive layer ADL1 may be disposed under (e.g., underneath) the support module SM-3, and the second adhesive layer ADL2 may be disposed on (e.g., above) the support module SM-3, but the present disclosure is not limited thereto or thereby. According to an embodiment, the display module DM disposed on (e.g., above) the support module SM-3 and the base substrate BP disposed under (e.g., underneath) the support module SM-3 may be disposed directly on the support module SM-3 without the adhesive layers ADL1 and ADL2.

The adhesive layers ADL1 and ADL2 may include at least one of silicone, acrylate, or urethane. The adhesive layers ADL1 and ADL2 may include the same or substantially the same material as those of the filling portions CM1 and CM2, but the present disclosure is not limited thereto or thereby. According to an embodiment, the adhesive layers ADL1 and ADL2 and the filling portions CM1 and CM2 may include different materials from each other.

In FIG. 10, each of the adhesive layers ADL1 and ADL2 is shown as having a single-layer structure, but the present disclosure is not limited thereto or thereby. According to an embodiment, each of the adhesive layers ADL1 and ADL2 may include multiple layers. As an example, both the first adhesive layer ADL1 and the second adhesive layer ADL2 may include multiple layers, or one of the first adhesive layer ADL1 or the second adhesive layer ADL2 may include multiple layers. When each of the adhesive layers ADL1 and ADL2 includes multiple layers, the multiple layers may include the same or substantially the same material as one another, or at least one of the multiple layers may include a material different from that if another.

The adhesive layers ADL1 and ADL2 may be integrally formed with the filling portions CM1 and CM2, respectively. In other words, the first adhesive layer ADL1 and the first filling portion CM1 may be integrally formed with each other, and the second adhesive layer ADL2 and the second filling portion CM2 may be integrally formed with each other. As an example, the adhesive layers ADL1 and ADL2 and the filling portions CM1 and CM2 may be formed of the same material through the same or substantially the same process (e.g., through the same single process), but the present disclosure is not limited thereto or thereby. As an example, the adhesive layers ADL1 and ADL2 may be formed separately from the filling portions CM1 and CM2. In other words, the adhesive layers ADL1 and ADL2 may be formed of the same or substantially the same material as those of the filling portions CM1 and CM2 but through different processes, or the adhesive layers ADL1 and ADL2 and the filling portions CM1 and CM2 may be formed of different materials through different processes from each other.

The display device may include the support module SM-3 including the adhesive layers ADL1 and ADL2 and the filling portions CM1 and CM2, and thus, the impact resistance and the durability of the display device may be improved.

Figure 11:
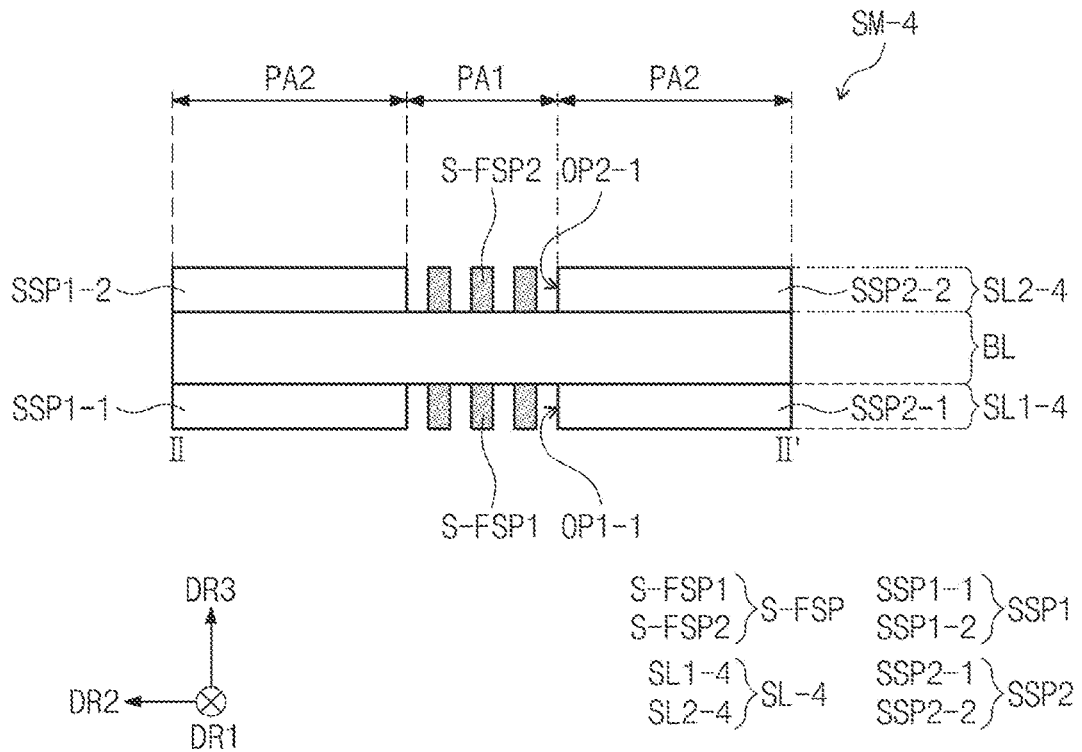
FIG. 11 is a cross-sectional view showing a support module according to an embodiment of the present disclosure.

Referring to FIG. 11, when compared with the support module SM shown in FIG. 6, the support module SM-4 shown in FIG. 11 may further include a plurality of sub-folding support portions S-FSP1 and S-FSP2, which overlaps with the folding area FA1 (e.g., refer to FIG. 1A) and are spaced apart from each other.

In more detail, referring to FIG. 11, the support module SM-4 may further the sub-folding support portions S-FSP1 and S-FSP2, which overlap with the folding area FA1 (e.g., refer to FIG. 1A) and are spaced apart from each other. When viewed in a plane defined by the first direction DR1 and the second direction DR2 (e.g., in a plan view), the sub-folding support portions S-FSP1 and S-FSP2 may extend in the first direction DR1 and may be spaced apart from each other in the second direction DR2 to form a stripe shape. A first support layer SL1-4 may be provided with a plurality of openings OP1-1 defined in a first portion PA1, and a second support layer SL2-4 may be provided with a plurality of openings OP2-1 defined in the first portion PA1.

FIG. 11 shows a structure in which a width in the second direction DR2 of each of the sub-folding support portions S-FSP1 and S-FSP2 is the same or substantially the same as a width in the second direction DR2 of each of the openings OP1-1 and OP2-1. However, the present disclosure is not limited thereto or thereby. As an example, the width in the second direction DR2 of each of the sub-folding support portions S-FSP1 and S-FSP2 may be different from the width in the second direction DR2 of each of the openings OP1-1 and OP2-1.

In addition, while FIG. 11 shows a structure in which the sub-folding support portions S-FSP1 and S-FSP2 have the same or substantially the same thickness as that of a first sub-support portion SSP1 and a second sub-support portion SSP2, the present disclosure is not limited thereto or thereby. As an example, the thickness of the sub-folding support portions S-FSP1 and S-FSP2 may be different from the thickness of the first sub-support portion SSP1 and the second sub-support portion SSP2.

In addition, while FIG. 11 shows a structure in which first sub-folding support portions S-FSP1 are disposed to overlap with second sub-folding support portions S-FSP2, respectively, the present disclosure is not limited thereto or thereby. As an example, the first sub-folding support portions S-FSP1 and the second sub-folding support portions S-FSP2 may be arranged in a staggered shape without overlapping with each other.

The sub-folding support portions S-FSP1 and S-FSP2 may include the same or substantially the same material as that of the first sub-support portion SSP1 and the second sub-support portion SSP2. The sub-folding support portions S-FSP1 and S-FSP2 may include at least one of an acrylic resin, an epoxy resin, or a urethane resin, but the present disclosure is not limited thereto or thereby. The sub-folding support portions S-FSP1 and S-FSP2 may include a material different from that of the first sub-support portion SSP1 and the second sub-support portion SSP2.

As the display device includes the support module SM-4 including the sub-folding support portions S-FSP1 and S-FSP2 that are spaced apart from each other in the first portion PA1, the repulsive force generated in the folding area FA (e.g., refer to FIG. 1A) during the folding operation of the display device may be reduced, and the flexibility of the display device may be improved.

Figure 12:
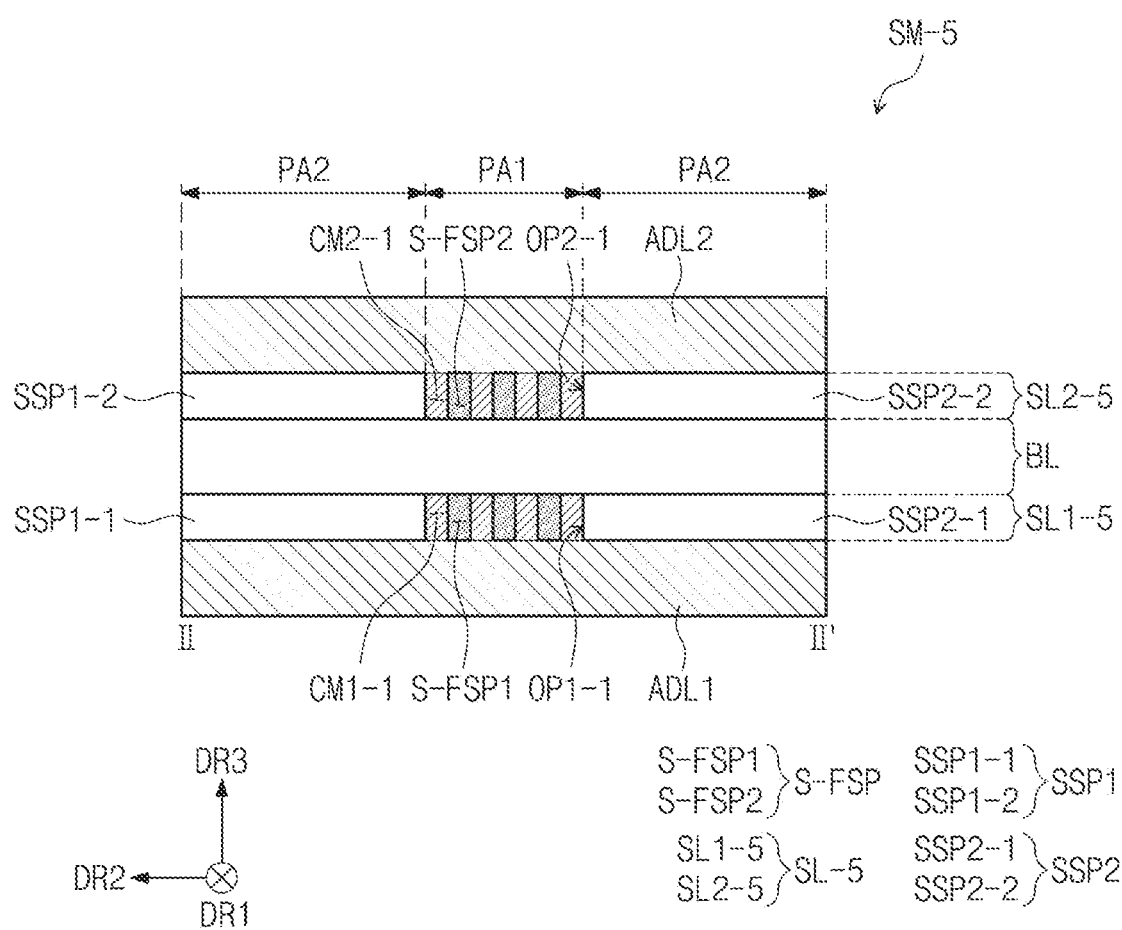
FIG. 12 is a cross-sectional view showing a support module according to an embodiment of the present disclosure.

Referring to FIG. 12, when compared with the support module SM-4 shown in FIG. 11, the support module SM-5 shown in FIG. 12 may further include a plurality of filling portions CM1-1 and CM2-1 disposed between a plurality of sub-folding support portions S-FSP1 and S-FSP2 and adhesive layers ADL1 and ADL2 disposed on (e.g., above) and under (e.g., underneath) a support layer SL-5, respectively.

In more detail, referring to FIG. 12, the support module SM-5 may further include the filling portions CM1-1 and CM2-1 disposed between the sub-folding support portions S-FSP1 and S-FSP2 and the adhesive layers ADL1 and ADL2 disposed on (e.g., above) and under (e.g., below) the support layer SL-5, respectively.

Referring to FIG. 12, the support module SM-5 may further include the filling portions CM1-1 and CM2-1 disposed between the sub-folding support portions S-FSP1 and S-FSP2. The filling portions CM1-1 and CM2-1 may be filled in the openings OP1-1 and OP2-1, respectively. In other words, the support layer SL-5 may further include the filling portions CM1-1 and CM2-1 filled in the openings OP1-1 and OP2-1, respectively.

FIG. 12 shows a structure in which each of the filling portions CM1-1 and CM2-1 has a single-layer structure, but the present disclosure is not limited thereto or thereby. Each of the filling portions CM1-1 and CM2-1 may include multiple layers. As an example, both of first filling portions CM1-1 and second filling portions CM2-1 may include multiple layers, or one of the first filling portions CM1-1 and the second filling portions CM2-1 may include multiple layers. When each of the filling portions CM1-1 and CM2-1 includes multiple layers, the multiple layers may include the same or substantially the same material as one another, or at least one of the multiple layers may include a material different from that of another.

In addition, FIG. 12 shows a structure in which the filling portions CM1-1 and CM2-1 are disposed in first openings OP1-1 and second openings OP2-1, respectively, but the present disclosure is not limited thereto or thereby. As an example, the first openings OP1-1 may be filled with the first filling portions CM1-1, and the second openings OP2-1 may not be filled with the second filling portions CM2-1. As another example, the second openings OP2-1 may be filled with the second filling portions CM2-1, and the first openings OP1-1 may not be filled with the first filling portions CM1-1.

The filling portions CM1-1 and CM2-1 may have a modulus smaller than a modulus of a support portion resin. As an example, the filling portions CM1-1 and CM2-1 may include at least one of silicone, acrylate, or urethane. The filling portions CM1-1 and CM2-1 and the support portion resin may contain materials of the same or substantially the same kind as each other. In the case where the filling portions CM1-1 and CM2-1 and the support portion resin contain the materials of the same or substantially the same kind as each other, a resin used to form the filling portions CM1-1 and CM2-1 may have a chemical structure different from that of the support portion resin, and thus, may have different physical properties from those of the support portion resin. As the support module SM-5 of the display device includes the filling portions CM1-1 and CM2-1 having the modulus smaller than the modulus of the support portion resin between the sub-folding support portions S-FSP1 and S-FSP2, the impact resistance of the display device may be improved.

The support module SM-5 may further include the adhesive layers ADL1 and ADL2 disposed under (e.g., underneath) and on (e.g., above) the support layer SL-5, respectively. The adhesive layers ADL1 and ADL2 may be disposed at a lowermost position and an uppermost position, respectively, of the support module SM-5 to planarize or substantially planarize the lower and upper portions of the support module SM-5.

The adhesive layers ADL1 and ADL2 may attach the base substrate BP disposed under (e.g., underneath) the support module SM-5 to the support module SM-5, and the display module DM disposed on (e.g., above) the support module SM-5 to the support module SM-5, respectively, but the present disclosure is not limited thereto or thereby. According to an embodiment, the display module DM disposed on (e.g., above) the support module SM-5 and the base substrate BP disposed under (e.g., underneath) the support module SM-5 may be disposed directly on the support module SM-5 without the adhesive layers ADL1 and ADL2.

FIG. 12 shows a structure in which each of the adhesive layers ADL1 and ADL2 has a single-layer structure, but the present disclosure is not limited thereto or thereby. As an example, each of the adhesive layers ADL1 and ADL2 may include multiple layers. In the case where each of the adhesive layers ADL1 and ADL2 includes multiple layers, the multiple layers may include the same or substantially the same material as one another, or at least one of the multiple layers may include a material different from that of another. The adhesive layers ADL1 and ADL2 may include at least one of silicone, acrylate, or urethane. The adhesive layers ADL1 and ADL2 may include the same or substantially the same material as those of the filling portions CM1-1 and CM2-1, but the present disclosure is not limited thereto or thereby. According to an embodiment, the adhesive layers ADL1 and ADL2 may include a material different from those of the filling portions CM1-1 and CM2-1.

The adhesive layers ADL1 and ADL2 may be integrally formed with the filling portions CM1-1 and CM2-1, respectively. As an example, the adhesive layers ADL1 and ADL2 and the filling portions CM1-1 and CM2-1 may be formed of the same material through the same or substantially the same process (e.g., through the same single process), however, the present disclosure is not limited thereto or thereby. As an example, the adhesive layers ADL1 and ADL2 may be formed separately from the filling portions CM1-1 and CM2-1. In other words, the adhesive layers ADL1 and ADL2 and the filling portions CM1-1 and CM2-1 may be formed of the same or substantially the same material as each other but through different processes, or the adhesive layers ADL1 and ADL2 and the filling portions CM1-1 and CM2-1 may be formed of different materials through different processes from each other.

The display device may include the support module SM-5 including the adhesive layers ADL1 and ADL2 and the filling portions CM1-1 and CM2-1, and thus, the impact resistance and the durability of the display device may be improved.

According to one or more embodiments of the present disclosure, the display device may include the support module that includes the base layer including the base fiber, and the support layers disposed on (e.g., above) and under (e.g., underneath) the base layer, respectively, and may be provided with at least one opening in the folding area, and thus, the display device may have excellent impact resistance and folding characteristics.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
   a first non-folding area;
   a second non-folding area spaced from the first non-folding area;
   a folding area configured to be folded relative to a folding axis extending in a first direction, the folding area being located between the first non-folding area and the second non-folding area in a second direction crossing the first direction;
   a display module; and
   a support module underneath the display module, the support module comprising:
   a base layer comprising a base fiber, the base fiber comprising a glass fiber, a carbon fiber, or an aramid fiber; and
   a support layer comprising:
   a first sub-support portion corresponding to the first non-folding area, the first sub-support portion being located above and underneath the base layer; and
   a second sub-support portion corresponding to the second non-folding area, the second sub-support portion being located above and underneath the base layer,
   wherein the first sub-support portion and the second sub-support portion comprise a support portion resin comprising at least one of an acrylic resin, an epoxy resin, or a urethane resin, and
   wherein an opening defined in the support portion resin between the first sub-support portion located above the base layer and second sub-support portion located above the base layer overlaps with the folding area to expose the base fiber of a portion of the base layer.

2. The display device of claim 1, wherein the support module further comprises a filling portion at the folding area between the first sub-support portion and the second sub-support portion, the filling portion comprising at least one of silicone, acrylate, or urethane.

3. The display device of claim 1, wherein the base fiber comprises:
   a plurality of vertical fibers extending in the first direction; and
   a plurality of horizontal fibers extending in the second direction, and
   wherein a fiber opening is defined between the vertical fibers that are adjacent to each other and the horizontal fibers that are adjacent to each other.

4. The display device of claim 1, wherein the support module further comprises an adhesive layer on and underneath the support layer, and comprising at least one of silicone, acrylate, or urethane.

5. The display device of claim 4, wherein the support module further comprises a filling portion at the folding area between the first sub-support portion and the second sub-support portion, and
   wherein the filling portion comprises the same material as that of the adhesive layer, and is formed integrally with the adhesive layer.

6. The display device of claim 1, wherein the support module further comprises a folding support portion between the first sub-support portion and the second sub-support portion to overlap with the folding area, the folding support portion comprising the support portion resin, and
   wherein the folding support portion has a thickness smaller than a thickness of each of the first sub-support portion and the second sub-support portion.

7. The display device of claim 6, wherein a ratio of the thickness of the first sub-support portion, the thickness of the folding support portion, and the thickness of the second sub-support portion is from 5:4:5 to 8:4:8.

8. The display device of claim 6, wherein the support module further comprises a filling portion on the folding support portion between the first sub-support portion and the second sub-support portion, the filling portion comprising at least one of silicone, acrylate, or urethane.

9. The display device of claim 8, wherein the support module further comprises an adhesive layer on and underneath the support layer, the adhesive layer comprising the same material as that of the filling portion, and formed integrally with the filling portion.

10. The display device of claim 1, wherein the support module further comprises a plurality of sub-folding support portions spaced from each other and overlapping with the folding area.

11. The display device of claim 10, wherein the sub-folding support portions comprise the same material as a material of the first and second sub-support portions.

12. The display device of claim 10, wherein the support module further comprises at least one filling portion between the sub-folding support portions, the at least one filling portion comprising at least one of silicone, acrylate, or urethane.

13. The display device of claim 10, wherein the support module further comprises an adhesive layer on and underneath the support layer, the adhesive layer comprising at least one of silicone, acrylate, or urethane.

14. The display device of claim 13, wherein the support module further comprises at least one filling portion between the sub-folding support portions, the at least one filling portion comprising the same material as that of the adhesive layer, and formed integrally with the adhesive layer.

15. A display device comprising:
a first non-folding area;
a second non-folding area spaced from the first non-folding area;
a folding area configured to be folded relative to a folding axis extending in a first direction, and located between the first non-folding area and the second non-folding area in a second direction crossing the first direction;
a display module; and
a support module underneath the display module, the support module comprising:
a base layer; and
a support layer above and underneath the base layer, and defining at least one opening in an area corresponding to the folding area,
wherein the base layer comprises a base fiber comprising a glass fiber, a carbon fiber, or an aramid fiber,
wherein the support layer comprises a support portion resin comprising at least one of an acrylic resin, an epoxy resin, or a urethane resin, and wherein the at least one opening is defined in the support portion resin of the support layer located above the base layer to expose the base fiber of a portion of the base layer at the folding area.

16. The display device of claim 15, wherein the support module further comprises at least one filling portion in the at least one opening, the at least one filling portion having a modulus smaller than a modulus of the support portion resin.

17. The display device of claim 15, wherein a modulus of the support portion resin is greater than or equal to about $10^3$ Mpa and less than or equal to about $10^4$ Mpa at a temperature of about −20° C.

18. The display device of claim 15, further comprising a folding support portion,
wherein the support layer has one opening defined therethrough to entirely overlap with the folding area, and the folding support portion is in the one opening and comprises the support portion resin.

19. A display device comprising:
a display module comprising a folding display portion, and a non-folding display portion adjacent to the folding display portion; and
a support module underneath the display module, the support module comprising:
a base layer comprising a base fiber, the base fiber comprising a glass fiber, a carbon fiber, or an aramid fiber; and
a support layer above and underneath the base layer, the support layer defining at least one opening defined therethrough to overlap with the folding display portion, and having a modulus greater than or equal to about $10^3$ Mpa and less than or equal to about $10^4$ Mpa at a temperature of about −20° C.,
wherein the at least one opening is defined in a support portion resin of the support layer located above the base layer to expose the base fiber of a portion of the base layer at the folding display portion.

20. The display device of claim 19, wherein the support module further comprises at least one filling portion in the at least one opening, the filling portion having a modulus smaller than the modulus of the support layer.

* * * * *